US008021523B2

(12) United States Patent
Jarvis

(10) Patent No.: US 8,021,523 B2
(45) Date of Patent: Sep. 20, 2011

(54) APPARATUS AND METHOD FOR ELECTROSTATIC FILTRATION OF FLUIDS

(76) Inventor: Paul Jarvis, Scottsdale, AZ (US)

( * ) Notice: Subject to any disclaimer, the term of this patent is extended or adjusted under 35 U.S.C. 154(b) by 773 days.

(21) Appl. No.: 12/135,204

(22) Filed: Jun. 8, 2008

(65) Prior Publication Data

US 2008/0302663 A1  Dec. 11, 2008

Related U.S. Application Data

(60) Provisional application No. 60/943,030, filed on Jun. 8, 2007.

(51) Int. Cl.
*C02F 1/48* (2006.01)
(52) U.S. Cl. ............... 204/164; 204/165; 210/748.01; 422/22
(58) Field of Classification Search ......... 210/748.01; 204/164, 165, 166; 422/22, 28
See application file for complete search history.

(56) References Cited

U.S. PATENT DOCUMENTS

| | | | | | |
|---|---|---|---|---|---|
| 4,372,837 | A | * | 2/1983 | Watson et al. | 204/562 |
| 5,352,347 | A | * | 10/1994 | Reichert | 204/665 |
| 6,129,829 | A | * | 10/2000 | Thompson | 204/665 |
| 6,576,107 | B2 | * | 6/2003 | Thompson | 204/572 |

* cited by examiner

*Primary Examiner* — Nam Nguyen
*Assistant Examiner* — Cameron J Allen
(74) *Attorney, Agent, or Firm* — Wright Law Group, PLLC; Mark F. Wright

(57) ABSTRACT

Disclosed herein is an electrostatic fluid filtration system suitable for removing sub micron insoluble contaminants known to cause varnish from fluids such as dielectric fluids. The electrostatic fluid filtration system is configured to remove both water and other contaminants from a target fluid (e.g. a dielectric fluid) and comprises a cabinet, a computer control unit, and one or more substantially cylindrical filtration units, including at least one of a water filtration unit and an electrostatic contaminant filtration unit. In the contaminant filtration unit, the target fluid flows radially through the filtration media that is positioned between the electrode plates in a generally horizontal flow pattern. This forces the target fluid to traverse multiple energy fields in a serpentine fashion and in a single pass through the contaminant filtration unit. After flowing through each layer of the filtration media, the target fluid is discharged from the electrostatic contaminant filtration unit.

21 Claims, 12 Drawing Sheets

APPARATUS AND METHOD FOR ELECTROSTATIC FILTRATION OF FLUIDS

RELATED APPLICATIONS

This application claims priority based on the filing of U.S. Provision Patent Application No. 60/943,030, which application was filed on Jun. 8, 2007, which application is incorporated by reference herein in its entirety.

BACKGROUND OF THE INVENTION

1. Field of the Invention

The present invention relates to fluid contamination and more particularly relates to the removal of contaminants from common fluids, including dielectric fluids.

2. Background Art

Contamination in hydraulic and lubrication systems is generally considered to be one of the most prevalent causes of machinery failure and can cost manufacturing facilities millions of dollars each year. Within the various types of contamination common to many complex industrial lubrication systems, varnish contamination is one of the most damaging and costly. Varnish contamination is generally considered to be the by-product of many oil-degradation processes in hydraulic and lubrication systems. The effects of varnish on industrial and manufacturing systems range from the nuisance of minor downtime and routine maintenance to a multi-million dollar catastrophic failure of major capital equipment.

A number of explanations for the observed increase in the occurrence of varnish in lubrication oils have been postulated. Tighter filtration requirements, higher flow rates for lubricating oil, higher operating temperatures within machinery, and the generalized industry migration to Group II bases oil formulations have been offered as potential culprits in the degradation of performance in oil lubrication systems.

Identifying varnish in lubrication systems and getting rid of it are essential to maintaining machinery reliability and overall production in a manufacturing or production environment. As hydraulic and lubrication systems continue to improve, the stress on the lubrication oil increases and requires improved base oils and additives to handle the higher temperatures and loads. Oil manufacturers have responded to this challenge by adopting Group II-finished products with improved additive characteristics. The new Group II lubricating oils show much improved oxidation stability over the older Group I formulated products that have been in place since the mid 1900's. However, now that Group II-based lubricating oils have been used in many hydraulic and lubrication systems for more than 10 years, new challenges are arising regarding sludge, varnish and deposit formations. These contaminants are causing problems with operations and, when left alone, may create significant operational issues in critical bearing and servo applications. These problems may also lead to reduced efficiency and production capability.

Varnish is a high molecular weight substance that is generally insoluble in oil. Varnish is typically found as a thin, insoluble film that is deposited on the metal surfaces of machinery components, such as reservoirs, bearings, and servo-valves. Varnish insolubles are more than 75 percent soft contaminants that are less than 1 micron in size and are not measured by traditional laboratory analysis. These varnish insolubles since they are sub-micron in size cannot be removed with traditional mechanical filters, which are only effective to 3 micron in size. Sub-micron insoluble compounds have polar affinities and, over time, begin to migrate from being suspended in the base oil to bonding on machine surfaces, based on system and oil conditions. Initially, the surfaces start to exhibit a gold or tan color, gradually deepening over time to darker gum-like layers that finally develop into varnish. The chemical composition of these sub-micron insoluble materials may vary from case to case. For example, the composition of a varnish on a gas turbine servo valve may not be the same as a varnish deposit found in a steam turbine oil system. Due to their high purity, insoluble compounds are generally considered to be less stable in Group II, III, and IV based oils.

Varnish formation is an operational and reliability issue that is costing manufacturing facilities millions of dollars in production downtime, equipment failures, and life of lubrication oils. All lubricating oils will create insoluble materials given severe and/or unusual operating conditions. These sub-micron insoluble contamination particles create lubricant imbalance due to factors such as oxidation, cross- and chemical-contamination, micro-dieseling and adiabatic compression. The tendency and speed at which lubricating oils produce these by-products is greatly influenced by the formulation of the product, the stress on the oil, and system contamination levels. Synthetic base stocks are an excellent platform; however, if they are not properly formulated, optimum performance will not be achieved, resulting in increased varnish formation.

The varnish deposits that form on machine surfaces can cause numerous operational issues by interfering with the reliable performance of the fluid and the machine's mechanical movements. They can also contribute to wear and corrosion or simply just cling to surfaces. In severe cases, varnish build-up could prevent hydrodynamic lubrication of a bearing surface, resulting in bearing failure. Other potential problems include:

Restriction and sticking in moving mechanical parts such as servo or directional valves;

Increased component wear due to varnish's propensity to attract dirt and solid particle contaminants;

Loss of heat transfer in heat exchangers due to varnish's insulation effect;

Catalytic deterioration of the lubricant;

Plugging of small oil flow orifices and oil strainers;

Increase of friction, heat and energy because varnish acts as a heat insulator;

Reduction in filter efficiency and potential filter plugging;

Damage to mechanical seals;

Journal-bearing failure; and

Increased maintenance costs due to cleanup and disposal of oil.

Previously known electrostatic filters, while useful in removing certain types of contaminants, have not been particularly effective in removing varnish from various fluids. For example, U.S. Pat. Nos. 6,129,829, 6,284,118, and 6,576,107 are representative of marginally effective filtration systems and which are incorporated herein by reference. Filter such as these are typically designed to be used for a pre-determined period of time (i.e., after so many hours of operation) and are then discarded and replaced by new filters. Unfortunately, there is no way to tell whether or not the filter is actually spent after the pre-determined period of time has elapsed. Depending on the type and quantity of fluid treated during the life of the filter, the filter may be used for too long of a period of time or disposed of prematurely.

Accordingly, those skilled in the art will recognize that there exists a continuing need to identify and develop alternative filtration systems for the treatment of fluids, such as dielectric fluids, in an efficient and cost effective manner. Without additional improvements in the effectiveness and efficiency in removing unwanted contaminants and varnish from various fluids, the operational aspects of certain types of equipment and machinery will continue to be suboptimal.

SUMMARY OF THE INVENTION

Disclosed herein is an electrostatic fluid filtration system suitable for removing sub micron insoluble contaminants known to cause varnish from fluids such as dielectric fluids. The electrostatic fluid filtration system is configured to remove both water and other contaminants from a target fluid (e.g. a dielectric fluid) and comprises a cabinet, a computer control unit, and one or more substantially cylindrical filtration units, including at least one of a water filtration unit and an electrostatic contaminant filtration unit. Each filtration unit comprises a housing, a replaceable cartridge positioned within the housing, and a removable lid to facilitate replacement of the replaceable cartridge. While the filtration units are described as being generally cylindrical, those skilled in the art will recognize that other shapes may be selected. However, the most preferred embodiments of the present invention employ cylindrical housings to maximize the surface area of the filtration media.

During normal operation of the system, the target fluid will encounter water filtration unit first and then the electrostatic contaminant filtration unit. The water filtration unit comprises a molecular sieve that is configured to capture water molecules while allowing the target fluid to bypass the filter. In the water filtration unit, the target fluid flows from the perimeter of the housing, through the filtration media, and then vertically downward to exit the water filtration unit.

The electrostatic contaminant filtration unit comprises a selectively sealable conductive housing with a replaceable cartridge comprising a plurality of spaced apart parallel electrically conductive chargeable electrode plates and sections of a filtration media disposed between the conductive electrode plates. In the contaminant filtration unit, the target fluid flows radially through the filtration media that is positioned between the electrically conductive chargeable electrode plates in a generally horizontal flow pattern. This forces the target fluid to traverse alternating multiple energy fields in an undulating serpentine fashion and in a single pass through the contaminant filtration unit. After flowing through each layer of the filtration media, the target fluid is discharged from the electrostatic contaminant filtration unit. Proper treatment of the contaminated fluid is accomplished by controlling the amount of time the fluid remains in the filtration unit ("dwell time") as well as increasing the surface area that the target fluid is exposed to during the treatment process.

BRIEF DESCRIPTION OF THE DRAWINGS

The preferred embodiments of the present invention will hereinafter be described in conjunction with the appended wherein like designations denote like elements and.

DETAILED DESCRIPTION OF THE INVENTION

Figure 1:
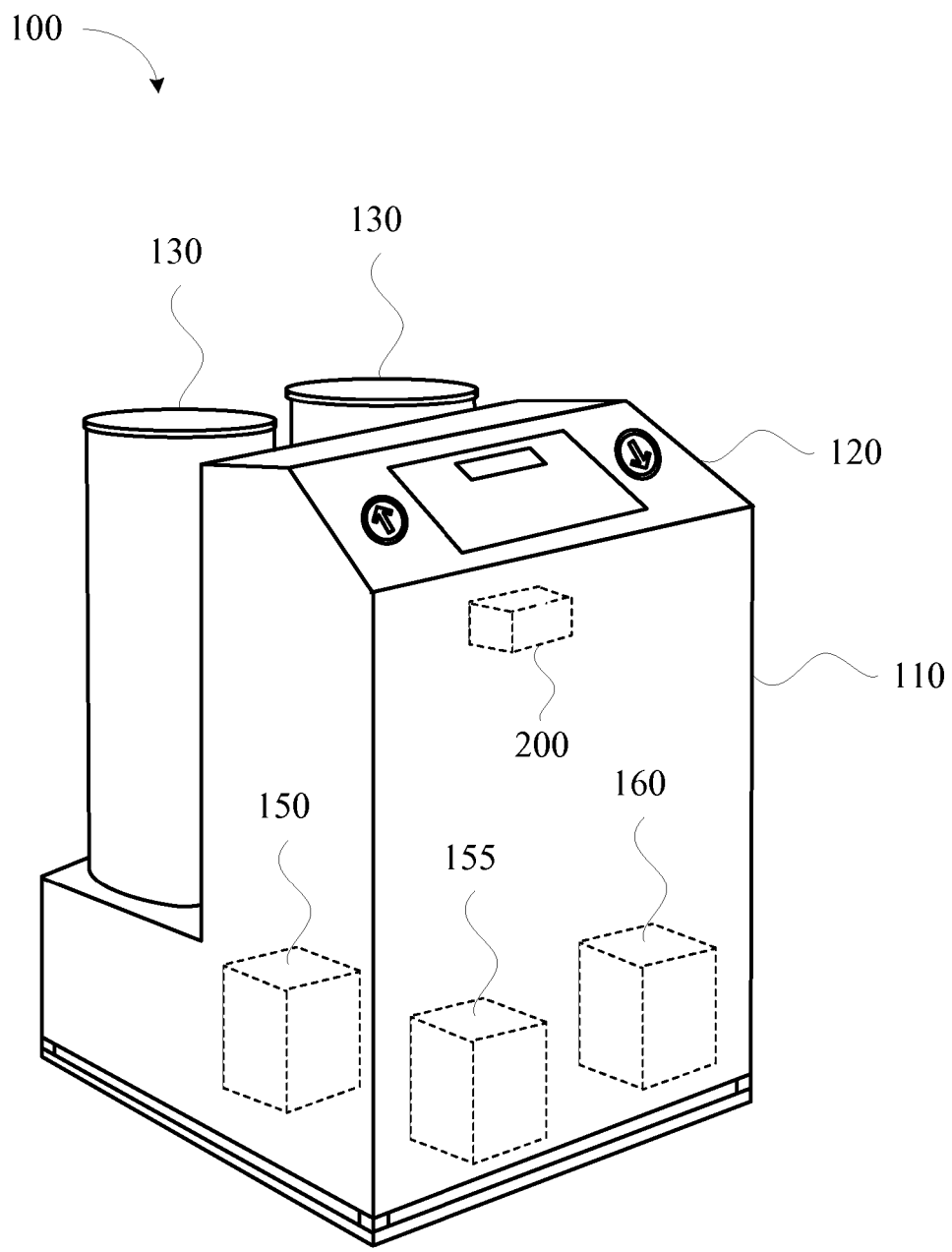
FIG. 1 is a perspective view of the front of an electrostatic fluid filtration system in accordance with a preferred embodiment of the present invention.

Disclosed herein is an electrostatic fluid filtration system suitable for removing sub micron insoluble contaminants known to cause varnish from fluids such as dielectric fluids. The electrostatic fluid filtration system is configured to remove both water and other contaminants from a target fluid (e.g. a dielectric fluid) and comprises a cabinet, a computer control unit, and one or more substantially cylindrical filtration units, including at least one of a water filtration unit and an electrostatic contaminant filtration unit. Each filtration unit comprises a housing, a replaceable cartridge positioned within the housing, and a removable lid to facilitate replacement of the replaceable cartridge.

During normal operation of the system, the target fluid will encounter water filtration unit first and then the electrostatic contaminant filtration unit. The water filtration unit comprises a molecular sieve that is configured to capture water molecules while allowing the target fluid to bypass the filter. In the water filtration unit, the target fluid flows from the perimeter of the housing, through the filtration media, and then vertically downward to exit the water filtration unit.

In general, the electrostatic contaminant filtration unit comprises a conductive housing and is configured with inlet and outlet ports being located on the side of the housing. The inlet and the outlet ports provide for communication of fluid from the outside of the housing to the inside of the housing. A replaceable cartridge comprising a plurality of electrically conductive electrode plates are supported in a spaced apart position inside the electrically conductive housing and are alternately oppositely chargeable with a positive or a negative direct current electrical charge. A contamination filtration media is disposed between the conductive plates. For treatment, the target fluid is introduced at a relatively low pressure into the filtration unit at the bottom of the housing through the inlet port. The pressure of the liquid to be treated is enough to overcome the head pressure inside the housing but does not need to be much higher. This is similar to the concept of filling a swimming pool with a water inlet positioned below the surface of the water.

Once inside the housing, the fluid to be treated enters an inlet zone located at the bottom of the conductive housing. The inlet zone is positioned prior to the filter cartridge and is provided to remove velocity and turbulence from the fluid flow entering the housing. This allows for an even rise of the fluid to be treated inside the conductive housing.

The fluid gradually rises until it contacts a conductive plate and then flows radially in a generally horizontal flow pattern through the filtration media that is positioned between the conductive plates until it reaches the wall of the conductive housing where the fluid makes a "u-turn" and flows through the filtration media towards the center of the conductive housing. This process is repeated multiple times, with the fluid passing between successive pairs of electrically chargeable plates. It should be noted that the nature of the alternately charged plates means the fluid is exposed to a constantly reversing electrical field as it passes through each successive layer of filtration media.

For example, in one filtration media layer, a positively charged plate will be on the bottom of the fluid pathway and a negatively charged plate will be on the top of the fluid pathway. Conversely, in the next filtration media layer the positively charged plate will be on the top of the fluid pathway and the negatively charged plate will be on the bottom of the fluid pathway. This forces the target fluid to traverse multiple alternating polarities in the energy fields in a serpentine fashion in a single pass through the contaminant filtration unit. After flowing through each layer of the filtration media, the target fluid is discharged from the housing through the outlet port located at the top of the housing. It should be noted that a collection reservoir is not needed and the treated fluid can be discharged in a continual flow at relatively low pressure.

In the most preferred embodiments of the present invention, the cycling of the fluid from near the exterior of the housing towards the interior portion of the housing and from the interior of the housing back towards the exterior of the housing happens nine different times before the fluid exits the housing. After the fluid exits the final filtration media, there is a double negative charge area to insure all particles in the treated fluid are given a negative charge before exiting the filter housing.

Referring now to FIG. 1, electrostatic fluid filtration system 100 in accordance with a preferred embodiment of the present invention comprises: a cabinet 110; a display panel 120; and at least one filtration unit 130. Cabinet 110 is configured to protect various internal components as well as to provide a movable platform for filtration units 130. In order to pass fluids into and out of filtration units 130, additional inlets and outlets (not shown this FIG.) may be configured in cabinet 110 and filtration units 130. In order to pump fluids through filtration units 130, a pump 150 is deployed within cabinet 110. In the most preferred embodiment of the present invention, pump 150 is a hub-mounted pump. The use of a hub-mounted pump will provide for a reduction in size and weight. In at least one preferred embodiment of the present invention, a fluid cooling unit 155 may also be housed inside cabinet 110. In order to energize filtration units 130, a high voltage generator 160 is also enclosed without cabinet 110. In addition, electrostatic fluid filtration system 100 will most preferably house a computer control unit 200.

In the most preferred embodiments of the present invention, cabinet 110 is manufactured from a lightweight yet durable material such as powder-coated sheet metal or the like. Those skilled in the art will recognize that other suitable materials such as fiberglass, polycarbonate plastics, etc. may also be used to fabricate cabinet 110. It is important to recognize that the most suitable material for cabinet 110 will be determined by the specific application, taking into account factors such as ambient environmental conditions, cost, duration of treatment, desired portability of electrostatic fluid filtration system 100, etc. Similarly, the exact size and shape of cabinet 100 may vary from application to application.

Additionally, for the most preferred embodiments of the present invention, cabinet 100 will be relatively weatherproof, with gaskets and seals being deployed to prevent unwanted moisture and debris from entering into cabinet 100. Explosion proof materials may also be used in order to make cabinet 100 suitable for deployment in areas where hazardous materials are being used.

Display panel 120 is used to communicate various types of information to the user or operator of electrostatic fluid filtration system 100 about the operation or performance of electrostatic fluid filtration system 100. Display panel 120 may comprise various types of feedback or display means such as gauges, lights, textual display panels, etc. Display panel 120 may be any type of display none to those skilled in the art (e.g., LED, LCD, etc.). In some preferred embodiments of the present invention, display panel 120 may be an interactive display panel and include touch-screen or other input technology to allow the user or operator of electrostatic fluid filtration system 100 to provide input into electrostatic fluid filtration system 100. In the most preferred embodiments of the present invention, display panel 120 is coupled to a computer control unit (not shown this FIG.), thereby allowing display panel 120 to be configured to display the desired information in response to the operation of electrostatic fluid filtration system 100. Display panel 120 is described in greater detail in conjunction with FIG. 6 below.

As part of electrostatic fluid filtration system 100, filtration units 130 are designed and configured to remove contaminants and varnish from a fluid and are firmly attached to cabinet 110. Although FIG. 1 depicts an electrostatic fluid filtration system 100 with two filtration units 130, those skilled in the art will recognize that electrostatic fluid filtration system 100 may be configured with more or fewer filtration units 130, depending on the specific application. For example, in order to increase the amount of fluid that can be treated by electrostatic fluid filtration system 100, it may be desirable to have three or more filtration units 130 operating in parallel.

Alternatively, in order to conserve costs in applications where the amount of fluid to be treated is nominal, a single filtration unit 130 may be deployed in conjunction with electrostatic fluid filtration system 100. Similarly, it may be desirable to operate two or more filtration units 130 in series, in order to remove different types of contaminants from the fluid to be treated. In the most preferred embodiments of the present invention, filtration units 130 are bolted to cabinet 110 but those skilled in the art will recognize that filtration units 130 may be attached to cabinet 110 by any suitable means known to those skilled in the art, including welding and the like. The actual type and arrangement of filtration units 130 is practically unlimited. Additional information about filtration units 130 is presented in conjunction with FIG. 3 and FIG. 6 below.

Figure 1A:
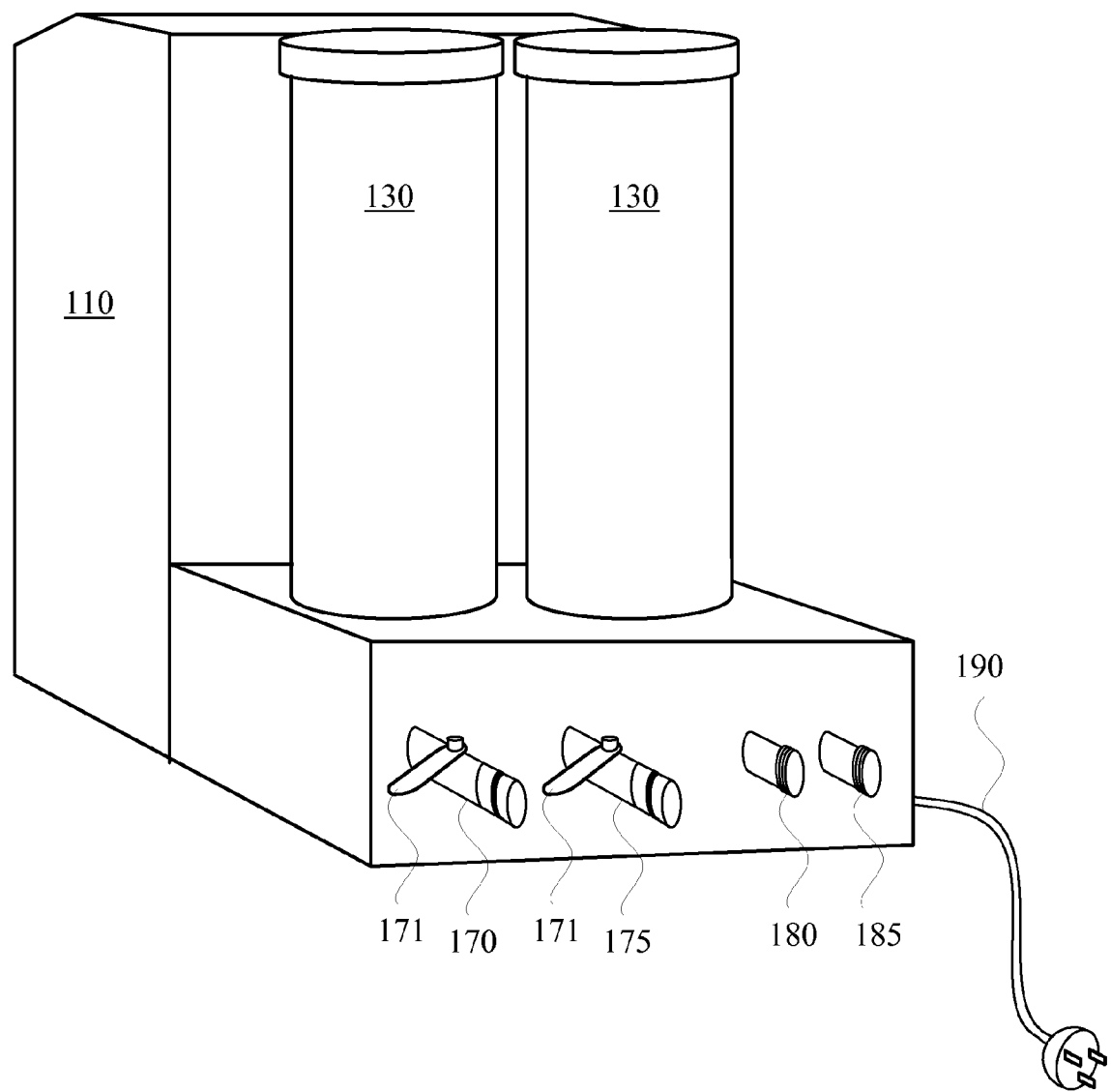
FIG. 1A is a perspective view of the back of an electrostatic fluid filtration system in accordance with a preferred embodiment of the present invention.

Referring now to FIG. 1A, back panel 140, an integral part of cabinet 110, provides a series of connections that enable fluids to be passed into and out of cabinet 110. Additionally, a power connection cable 190 is used to energize the operational components of cabinet 110, including high voltage generator 160 of FIG. 1. These connections include an inlet 170 where the fluid to be treated enters cabinet 110 and an outlet 175 where the fluid is discharged from cabinet 110 after treatment. Each of inlet 170 and outlet 175 are fitted with a shutoff handle 171. Additionally, back panel 140 comprises an inlet 180 and an outlet 185 which may used as supply and return lines for coolant (e.g. water) to be supplied to fluid chiller unit 155 of FIG. 1.

Figure 2:
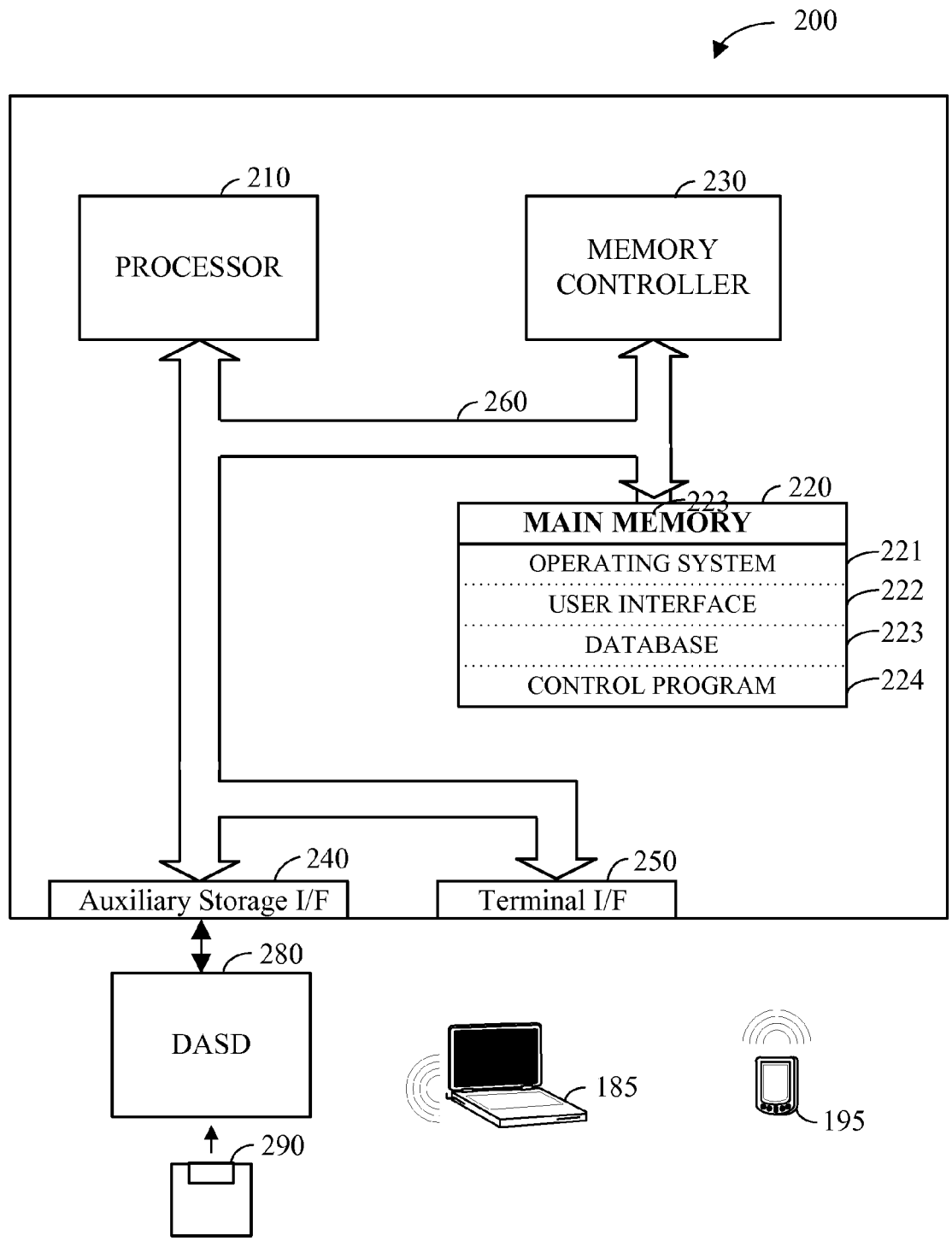
FIG. 2 is a block diagram of a computer control unit suitable for use in conjunction with an electrostatic fluid filtration system in accordance with a preferred embodiment of the present invention.

Referring now to FIG. 2, Computer Control Unit 200 for configured for use in the most preferred embodiments of the present invention suitably comprises at least one Central Processing Unit (CPU) or processor 210, a main memory 220, a memory controller 230, an auxiliary storage interface 240, and a terminal interface 250, all of which are interconnected via a system bus 260. In the most preferred embodiments of the present invention, Computer Control Unit 200 is configured to monitor oil flow, voltage, filter life, leak detection, and temperature of the oil, among other operational parameters.

Note that various modifications, additions, or deletions may be made to Computer Control Unit 200 illustrated in FIG. 2 within the scope of the present invention such as the addition of cache memory or other peripheral devices. FIG. 2 is not intended to be exhaustive, but is presented to simply illustrate some of the more salient features of Computer Control Unit 200. Those skilled in the art will recognize that Computer Control Unit 200 may, in fact, comprise multiple disparate systems, each configured to accomplish certain tasks and objectives while working in concert with other systems to accomplish the methods of the various preferred embodiments of the present invention.

Processor 210 performs computation and control functions of Computer Control Unit 200, and most preferably comprises a suitable central processing unit (CPU). Processor 210 may comprise a single integrated circuit, such as a microprocessor, or may comprise any suitable number of discrete or integrated circuit devices (e.g., field programmable gate arrays or FPGAs) and/or circuit boards working in cooperation to accomplish the functions of a processor or CPU. Processor 210 suitably executes one or more software programs contained within main memory 220.

Auxiliary storage interface 240 allows Computer Control Unit 200 to store and retrieve information from auxiliary storage devices, such as an external storage mechanism including magnetic disk drives (e.g., hard disks or floppy diskettes) or optical storage devices (e.g., CD-ROM or DVD). One suitable storage device is a direct access storage device (DASD) 280. As shown in FIG. 2, DASD 280 may be a DVD or CD-ROM drive that may read programs and data from a DVD or CD disk 290.

Memory controller 230, through use of an auxiliary processor (not shown) separate from processor 210, is responsible for moving requested information from main memory 220 and/or through auxiliary storage interface 240 to processor 210. While for the purposes of explanation, memory controller 230 is shown as a separate entity; those skilled in the art understand that, in practice, portions of the function provided by memory controller 230 may actually reside in the circuitry associated with processor 210, main memory 220, and/or auxiliary storage interface 240.

Terminal interface 250 is a communication interface that allows users, system administrators and computer programmers to communicate with Computer Control Unit 200, normally through separate workstations or through stand-alone computer systems or devices such as laptop computer 185 and personal digital assistant (PDA) 195 of FIG. 2. This communication interface includes the necessary hardware and software to communicate via both wired (e.g., USB, Firewire, etc.) and wireless means, (e.g., IR, Wi-Fi, Bluetooth, etc.). Although Computer Control Unit 200 depicted in FIG. 2 contains only a single main processor 210 and a single system bus 260, it should be understood that the present invention applies equally to systems having multiple processors and multiple system buses. Similarly, although the system bus 260 of the preferred embodiment is a typical hardwired, multi-drop bus, any connection means that supports bi-directional communication in a computer-related environment could be used.

In at least one preferred embodiment of the present invention, main memory 220 suitably comprises: an operating system 221; a user interface 222; and a database 223. The term "memory" as used herein refers to any storage location in the virtual memory space of Computer Control Unit 200.

It should be understood that main memory 220 might not necessarily contain all parts of all components shown. For example, portions of operating system 221 may be loaded into an instruction cache (not shown) for processor 210 to execute, while other files may well be stored on magnetic or optical disk storage devices (not shown). In addition, although database 223 is shown to reside in the same memory location as operating system 221, it is to be understood that main memory 220 may consist of multiple disparate memory locations.

Operating system 221 includes the software that is used to operate and control Computer Control Unit 200. In general, processor 210 typically executes operating system 221. Operating system 221 may be a single program or, alternatively, a collection of multiple programs that act in concert to perform the functions of an operating system. Any operating system now known to those skilled in the art or later developed may be considered for inclusion with the various preferred embodiments of the present invention.

User interface 222 is a computer program that offers the functions of a user interface that is designed and configured to present the user or operator of electrostatic fluid filtration system 100 with information relative to the operation and function of electrostatic fluid filtration system 100. The specific functions and operations of user interface 222 will be dictated by the application environment for electrostatic fluid filtration system 100. However, in general, user interface 222 will be used to provide the user or the operator of electrostatic fluid filtration system 100 with information such as oil flow, voltage, filter life, leak detection, and temperature of the oil, among other operational parameters. The information generated, monitored, and/or calculated by Computer Control Unit 200 may be stored in and retrieved from database 223 and may be displayed to the user or operator of electrostatic fluid filtration system 100 via display panel 120 of FIG. 1.

Database 223 is representative of any suitable database known to those skilled in the art. In the most preferred embodiments of the present invention, database 223 is a Structured Query Language (SQL) compatible database file capable of storing information relative to various items that may be of interest to the users of electrostatic fluid filtration system 100 of FIG. 1, including various parameters for electrostatic fluid filtration system 100, including oil flow, voltage, filter life, leak detection, and temperature of the oil, among other operational parameters. Those skilled in the art will recognize that other types of information for other types of data (e.g., historical, informational, technical, etc.) may be stored and retrieved using database 223 as well.

While database 223 is shown to be residing in main memory 220, it should be noted that database 223 may also be physically stored in a location other than main memory 220. For example, database 223 may be stored on external storage device 270 or DASD 280 and coupled to Computer Control Unit 200 via auxiliary storage I/F 240. Additionally, while shown as a single database 223 and implemented with multiple relational data tables, those skilled in the art will recognize the database 223 may actually comprise a flat file system or a series of related databases, logically linked together by various methodologies. Depending on the specific application and design parameters, database 223 may take many different forms when implemented.

Control program 224 is a computer program that is executed by CPU 210 and that is used to monitor and control the operation of electrostatic fluid filtration system 100 of FIG. 1. For example, control program 224 is used to determine what type of information is displayed on display panel 120 and to control display panel 120 and the various gauges and ancillary displays contained on display panel 120. Control program 224 may also be used to perform safety functions for electrostatic fluid filtration system 100 of FIG. 1. This would include monitoring pressure, temperature, and vacuum, etc. and shutting electrostatic fluid filtration system 100 of FIG. 1 down in the case of any unsafe or undesirable condition. In addition, control program 224 will monitor the current, voltage, and resistance of the electrical fields created in electrostatic filtration cartridges and, using this information, will calculate the expected remaining useful life for contamination filtration units 130 of FIG. 1. Control program 224 may also be configured to display the remaining useful filter life and dwell time for the fluid inn filtration units 130 on display 120.

Those skilled in the art will also recognize that the functions of Computer Control Unit 200 may also be performed by a separate computing system, such as laptop computer 185. In this embodiment of the present invention, the capabilities of Computer Control Unit 200 would generally be limited to the storage and execution of the configuration instructions received from laptop 185. For example, the inclusion of a Universal Serial Bus (USB) interface would allow the operator of electrostatic fluid filtration system 100 of FIG. 1 to programmatically configure the operation of electrostatic fluid filtration system 100 on laptop 185 and then transfer the configuration to electrostatic fluid filtration system 100. Similarly, the operational and environmental conditions of electrostatic fluid filtration system 100 could be stored and then periodically transferred to laptop 185 via a USB or other connection. Finally, it should be noted that additional software components, not shown in this figure, might also be included, depending on the specific application.

Figure 3:
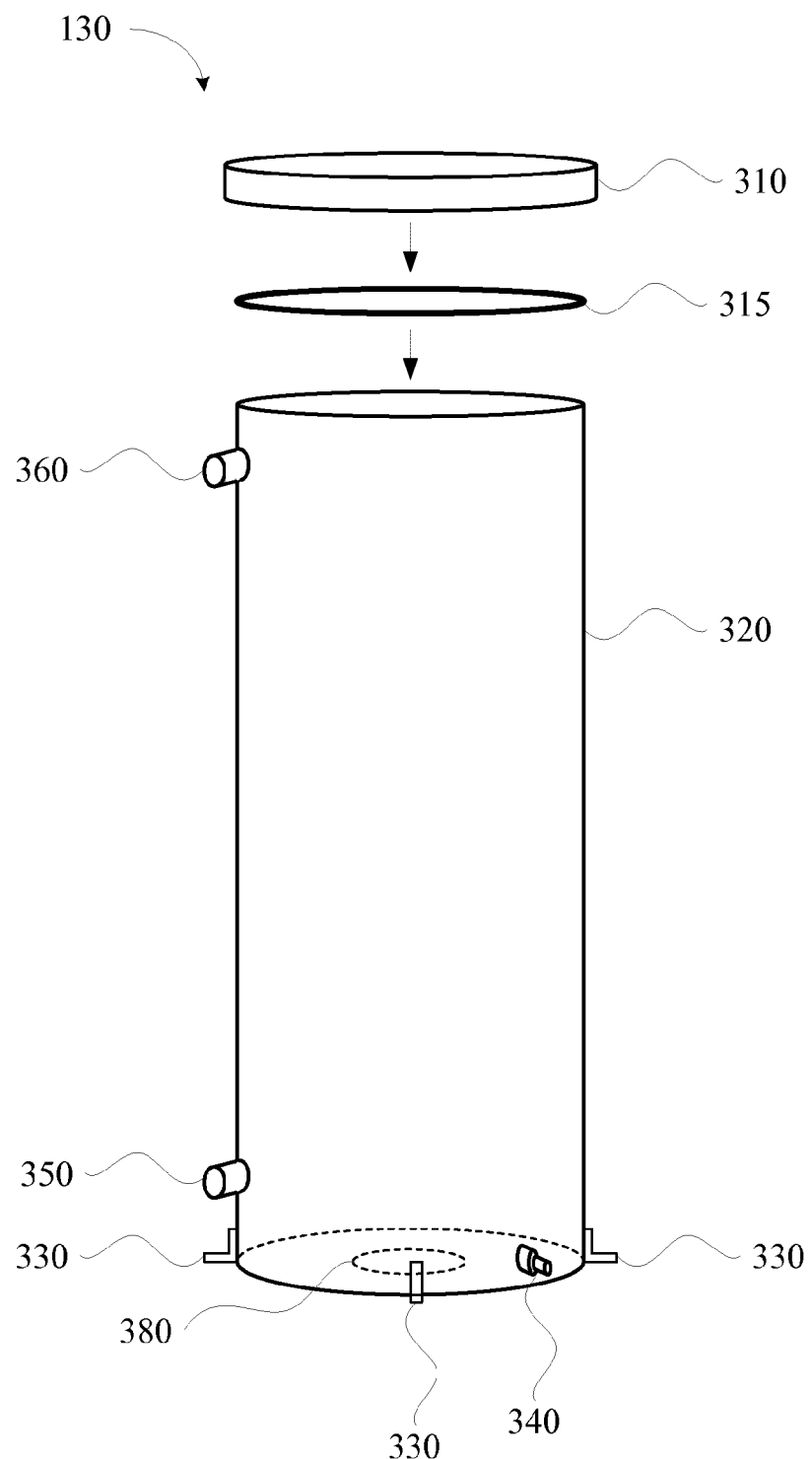
FIG. 3 is a perspective view of a filtration unit suitable for use in conjunction with an electrostatic fluid filtration system in accordance with a preferred embodiment of the present invention.

Referring now to FIG. 3, a filtration unit 130 in accordance with a preferred embodiment of the present invention comprises: a housing 320; an o-ring 315; a lid 310; a drain 340; an inlet 350; an outlet 360; an electrical connection aperture 380; and, in some applications, one or more connecting braces 330. Additionally, depending on the application, a water filtration cartridge or a contaminant filtration cartridge will be inserted into the housing of filtration unit 130. It should be noted that filtration unit 130 can be deployed as a water filtration unit or a contaminant filtration unit, depending on the type of cartridge that is inserted into filtration unit 130.

In the most preferred embodiments of the present invention, housing 320 and lid 310 are manufactured from a durable, conductive, corrosion-resistant metal. O-ring 315 is manufactured from any gasket or seal material suitable for the application. High quality rubber, silicone, and the like can be used to make o-ring 315. Lid 310 is fabricated so as to securely yet removably be fastened to the top of housing 320. Any means known to those skilled in the art may be deployed. This would include the use of a threaded screw fit, a compression band, screws, bolts, etc.

Electrical connection aperture 380 is provided for at least two purposes. When filtration unit 130 is to be deployed as a water filtration unit, electrical connection aperture 380 will be used to pass water out of housing 320. When filtration unit 130 is to be deployed as a contaminant filtration unit, electrical connection aperture 380 will be used to connect the cartridge inside housing 320 to an external high-voltage generator.

Inlet 350 is provided to allow for the passage of the fluid to be treated to enter into housing 320. Similarly, outlet 360 is provided to allow for the passage of the fluid to be treated to exit housing 320 after it has been treated. It should be noted that when filtration unit 130 is to be deployed as a water filtration unit, outlet 360 will be plugged and the water that is extracted from the fluid to be treated will be passed out of housing 320 through electrical connection aperture 380 in the bottom of housing 320.

Drain 340 is a standard drain valve or drain cock that allows all or substantially all of the fluid contents of housing 320 to be drained when the cartridge inside housing 320 is to be replaced.

Connecting braces 330. are typically welded or otherwise attached to the sides of housing 320 and are provided as a means to secure housing 320 to cabinet 100 of FIG. 1. To connect housing 320 to cabinet 100 of FIG. 1, connecting braces 330 may be welder or bolted to cabinet 100 of FIG. 1 in the desired location.

Figure 4:
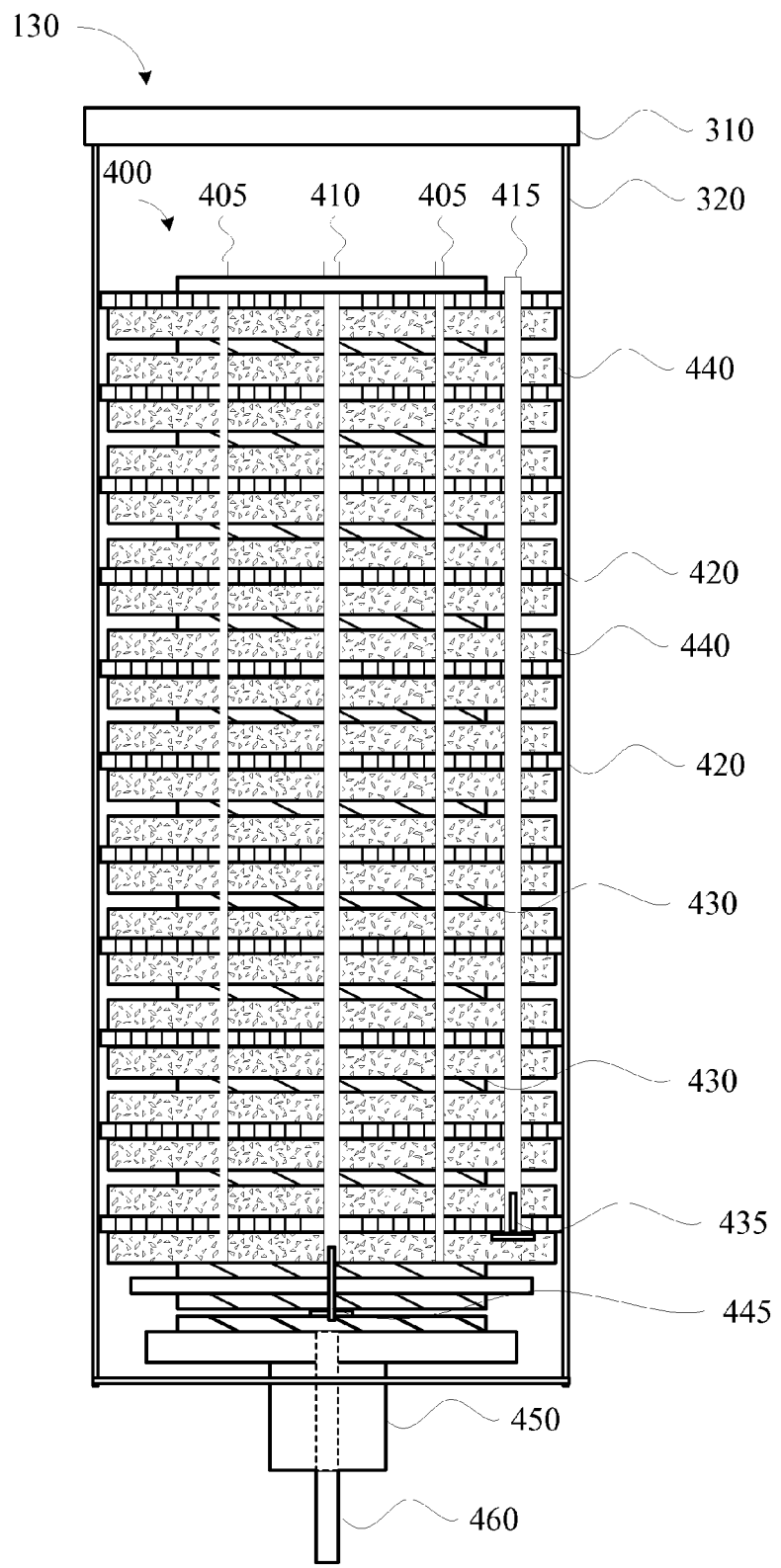
FIG. 4 is a cross-sectional view of a electrostatic filtration cartridge suitable for use in conjunction with a fluid filtration system in accordance with a preferred embodiment of the present invention.

Referring now to FIG. 4, a contaminant filtration cartridge 400 in accordance with a preferred embodiment of the present invention is shown disposed inside filtration unit 130 of FIG. 1. As shown in FIG. 4, a plurality of substantially circular and electrically conductive plates are spaced apart by a filtration media 440. The electrically conductive plates include both positively chargeable plates 430 and negatively chargeable plates 420. It should be noted that positively chargeable plates 430 and negatively chargeable plates 420 have apertures formed in the center of each plate, with the radius of the substantially circular aperture in negatively chargeable plates 420 being larger than the substantially circular aperture of positively chargeable plates 430.

Filtration media sections 440 have several important functions. They provide proper electrode spacing to ensure that the applied voltage is not sufficient to result in shorting between plates. They are desirably capable of accepting a D.C. charge, provide cartridge integrity, and must capture and retain sub-micron particles. The filter media section thicknesses are determined by the voltage, electrode spacing, dielectric strength of the filtration media sections, and the desired end results of the filtering process. Typically, the media thickness is from about 1.0 to about 1.5 inches when suitable voltages are used. Typically, the voltage is from about 3,000 to about 18,000 D.C. volts. The filter media used is selected to have a pore size consistent with the types of particulates that are to be removed from the fluid to be treated and the size of particulates, which are desirably removed. The filter media desirably comprises a dielectric material capable of accepting a D.C. electric charge such as reticulated foam, paper, fiberglass, fiberboard, polyester, cotton, etc. In the most preferred embodiments of the present invention, the filter media sections are desirably a material such as reticulated foam, which becomes charged in the vicinity of the electrode plates. These foam pores are of a size selected to eliminate the desired particulates. The term "reticulated" is used to refer to foam which has continuous passageways therethrough such as zeolites, and the like.

It should be recognized by those skilled in the are that the filters disclosed herein will eventually become loaded with captured particulates and other contaminants and require periodic replacement. This is easily accomplished by removing lid 310 and lifting cartridge 400 from housing 320. To facilitate removal of cartridge 400, a handle may be affixed to the top of cartridge 400.

Standoff insulators 410 and 415 serve an important purpose. Standoff insulators 410 and 415 serve to provide a continuous electrical connection between positively chargeable plates 430 and negatively chargeable plates 420 positively chargeable plates 430 and negatively chargeable plates 420, respectively. Additional information about standoff insulators 410 and 415 are discussed in conjunction with FIG. 4Ab below. In electrostatic filtration operation, conductive housing 320 is electrically grounded by electrically connecting housing 320 to an electrically neutral ground point and may also be electrically connected to one or more negatively chargeable plates 420. This may be accomplished by manufacturing negatively chargeable plates 420 with tight enough tolerances so that the edges of negatively chargeable plates 420 are in physical contact with the inner wall of housing 320 and/or using a conductor (e.g. wire) to connect negatively chargeable plates 420 to the inner wall of housing 320. This tight fitting nature of the negatively chargeable plates 420 restricts or severely minimizes the amount of fluid that can travel vertically upward along the walls inside conductive housing 320 and forces the fluid to flow away from the walls of conductive housing 320 and towards the center of housing 320. Additionally, conductive housing 320 will be electrically connected to a grounding point (e.g. negative terminal) of high voltage generator 160 of FIG. 1.

It should be noted that the dielectric fluid contained in conductive housing 320 serves to insulate the edges of positively chargeable plates 430 from the negatively chargeable (grounded) housing 320.

Non-conductive threaded plastic rods 405 are used to hold the various components of cartridge 400 in position and act to "sandwich" the various components into place. In the most preferred embodiments of the present invention, there are four plastic rods 405, with each being spaced equidistant around each positively chargeable plates 430 and negatively chargeable plates 420 and passing through apertures formed in the surface of positively chargeable plates 430 and negatively chargeable plates 420. Additional information about plastic rods 405 is presented in conjunction with FIG. 4B below.

Figure 4A:
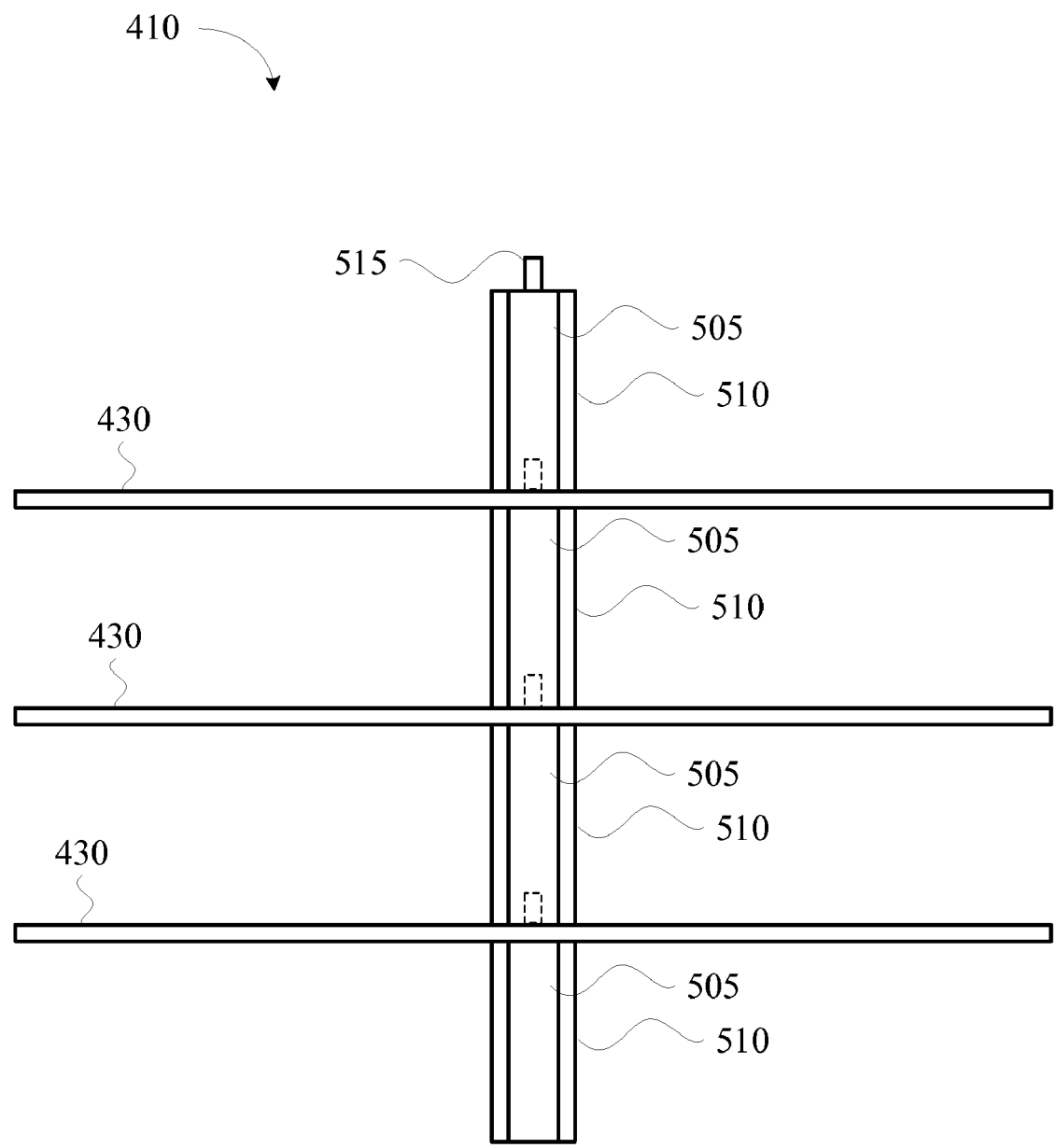
FIG. 4A is a detail drawing of a conductive plate standoff rod in accordance with a preferred embodiment of the present invention.

Referring now to FIG. 4A, a section of standoff insulator 410 is shown. Standoff insulator is comprised of a series of short metal rod sections 505 that are most preferably manufactured from an electrically conductive metal (e.g., aluminum), thereby creating a plurality of solid machined conductive inserts that are used to position and electrically connect the electrode plates. Each rod 505 is threaded with a male threaded extension 515 on one end and a threaded aperture on the other end. To join multiple rods 505 together, a threaded extension 515 of a first rod 505 is screwed into the aperture on the end of another rod 505. Before rod sections 505 are joined together, an insulating jacket 510 is placed over each rod section 505. Additionally, a positively chargeable electrode plate 430 is placed over the threaded extension 515. Then, two rod sections 505 can be joined together by screwing a threaded extension 515 of a first rod 505 is screwed into the aperture on the end of another rod 505. In this fashion, a continuous electrical connection can be maintained from the first positively chargeable electrode plate 430 to the last positively chargeable electrode plate 430 and each positively chargeable electrode plate 430 in between. The description provided herein for standoff insulator 410 applies to standoff insulator 415 as well, with the only significant difference being that standoff insulator 410 is used to electrically connect positive electrode plates 430 and standoff insulator 415 is used to electrically connect negatively chargeable electrode plates 420.

Figure 4B:
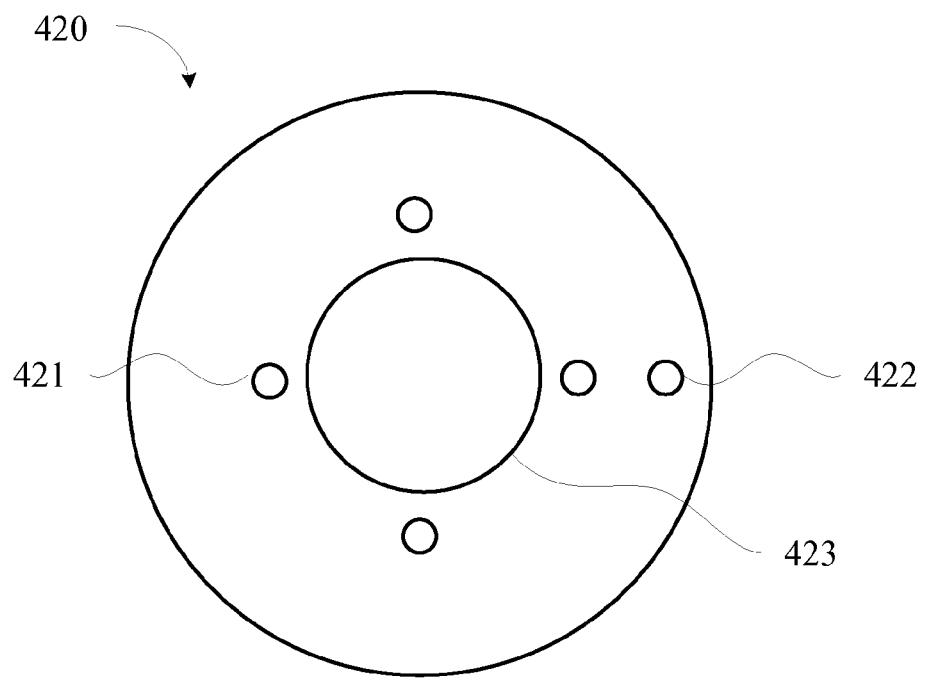
FIG. 4B is a plan view of a negatively charge electrode plate and a positively charged electrode plate in accordance with a preferred embodiment of the present invention.
Figure 4B:
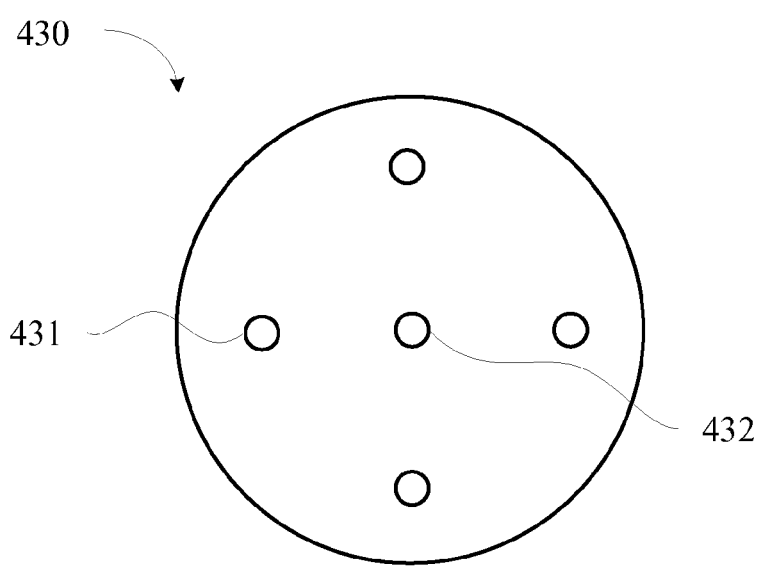

Referring now to FIG. 4B, a positively chargeable electrode plate 430 and a negatively chargeable plate 420 are depicted in plan view. Negatively chargeable plate 420 has an outer diameter that is machined to be only slightly small then the inner diameter of electrically conductive housing 320 of FIG. 3. In this fashion, each negatively chargeable plate 420 makes electrical contact with the inner wall of electrically conductive housing 320 of FIG. 3. Additionally, in the most preferred embodiments of the present invention, each negatively chargeable plate 420 has a series of four rod apertures 421 spaced substantially equidistant around the inner aperture 423. Rod apertures 421 for each negatively chargeable plate 420 are aligned and positioned over each other so that plastic rods 405 of FIG. 4 can be inserted through each rod aperture 421 in each negatively chargeable plate 420. In addition, each negatively chargeable plate 420 has a standoff aperture 422 formed near the outer edge. Standoff insulator 415 is inserted through this aperture as described in FIG. 4A.

In a similar fashion, each positively chargeable plate 430 has a series of four rod apertures 431 spaced substantially equidistant around the inner aperture 432 (which also serves as standoff aperture 432). Once all rod apertures 421 and 431 are properly aligned, plastic rods 405 of FIG. 4 can be inserted through each rod aperture 421 in each negatively chargeable plate 420 and each rod aperture 431 of each positively chargeable plate 430. In addition, each positively chargeable plate 430 has a standoff aperture 432 formed at the center. Standoff insulator 410 is inserted through this aperture as described in FIG. 4A.

By alternating positively chargeable plates 430 and negatively chargeable plates 420, the flow of the fluid to be treated can be manipulated. Since the outer diameter of negatively chargeable plates 420 is in close contact with the inner wall of housing 320, the fluid to be treated cannot easily pass between the edge of negatively chargeable plates 420 and the inner wall of housing 320. This forces the fluid to travel in a substantially horizontal direction and radially inward from the inner wall of housing 320 towards the center of housing 320. However, once the fluid to be treated arrives at the center of a positively chargeable plate 430, the fluid cannot move anywhere but radially outward away from the center of housing 320. Large inner aperture 423 of each negatively chargeable plate 420 provides an easy path for the fluid to be treated. Accordingly, the fluid will move in a serpentine fashion through each successive layer of filter media 440, thereby ensuring an extended dwell time and exposing the fluid to be treated to a substantially increase surface area of filtration media 440. This will provide for optimal filtration of undesired contaminants from the fluid to be treated.

High voltage pass through portal 450 is an insulated passageway that extends from the exterior of housing 320 into the interior of housing 320. High voltage cable 460 enters housing 320 through high voltage pass through portal 450. High voltage cable 460 is electrically connected to positively chargeable plates 430 and to high voltage generator 160 of FIG. 1. In this fashion, positively chargeable plates 430 can be energized to the desired voltage level.

Figure 5:
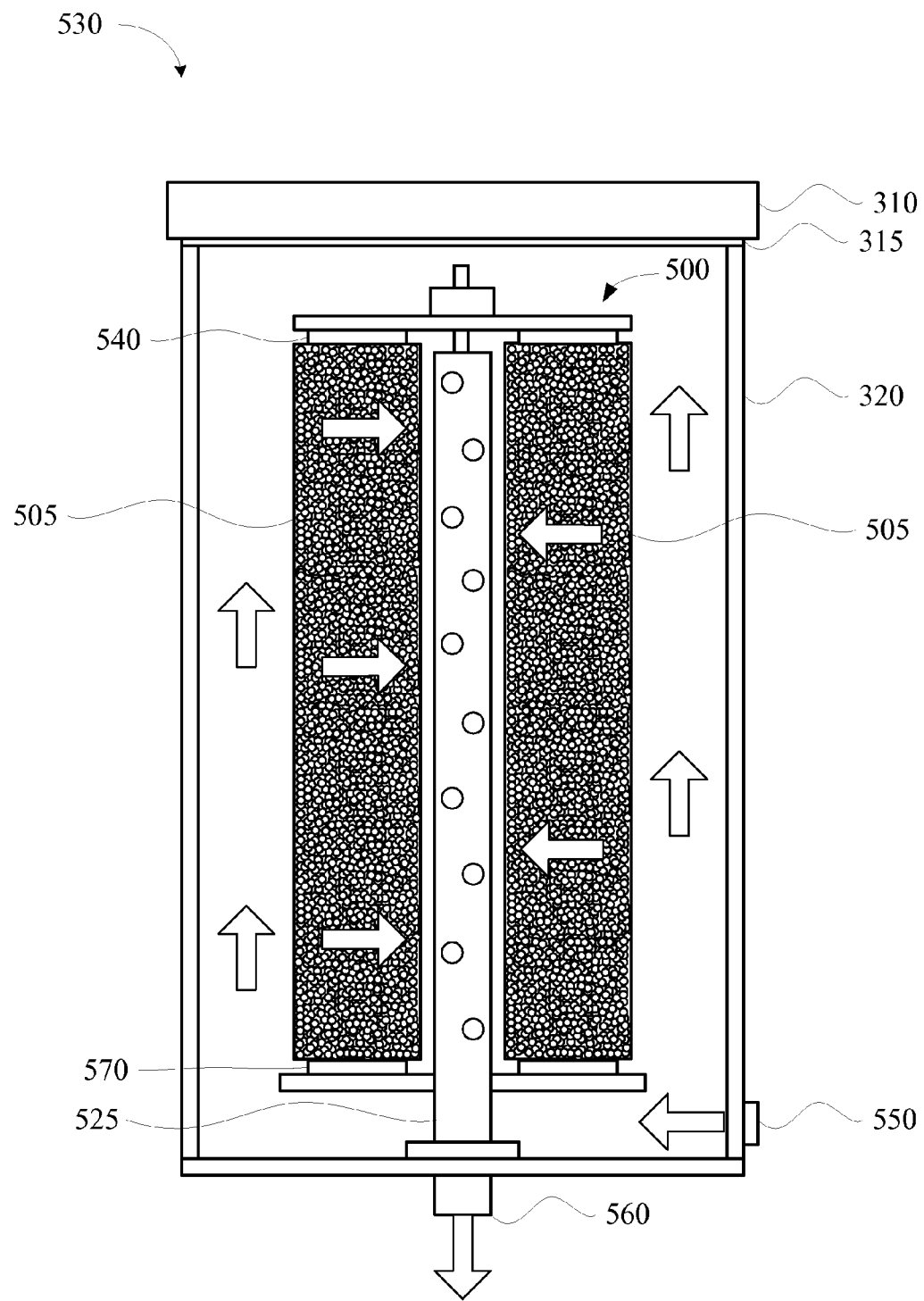
FIG. 5 is a cross-sectional view of a water filtration cartridge suitable for use in conjunction with a fluid filtration system in accordance with a preferred embodiment of the present invention.

Referring now to FIG. 5, a cross sectional view of a water filtration unit 530 in accordance with a preferred embodiment of the present invention is depicted. As shown in FIG. 5, water filtration unit 530 contains a replaceable water filtration cartridge 500 that operates as a "molecular sieve" to remove water from the target fluid. Upper seal 540 and lower seal 570 serve to isolate fluid collection tube 525 from the fluid to be treated until it passes through beads 505. Fluid collection tube 525 is a perforated tube that is positioned to collect the fluid to be treated after it flows through beads 505. Fluid collection tube 525 is connected to outlet 560 and provides a pathway for the fluid to be treated to exit water filtration unit 530.

Water filtration cartridge 500 contains a plurality of small crystalline, highly porous "beads" 505. Beads 505 are characterized by a three-dimensional pore system, with pores of a precisely defined diameter. The diameter is selected for the molecules of a specific fluid, such as water. The pores can be adjusted to precisely determine the exact size of uniform openings in beads 505, thereby allowing for molecules smaller than the pore diameter to be adsorbed into beads 505 while excluding larger molecules, hence the name "molecular sieve." Beads 505 will most preferably consist of aluminosilicate minerals or other compounds, including natural and synthetic compounds such as clays, porous glasses, microporous charcoals, active carbons etc., that have open pore structures through which small molecules can diffuse.

The fluid to be treated enters water filtration unit 530 through inlet 550 under low pressure and will eventually exit water filtration unit 530 through outlet 560. After entering water filtration unit 130, the fluid to be treated will flow vertically upwards and then radially through beads 505, eventually entering fluid collection tube 525. Any water that is present in the fluid to be treated will be captured by beads 505, while allowing the fluid to be treated to enter collection tube 525. After entering fluid collection tube 525, the fluid to be treated will flow vertically downwards until it flows out outlet 560. From this point, the fluid to be treated can be introduced into one or more contaminant filtration units 130 to be treated for the removal of contaminants.

Figure 6:
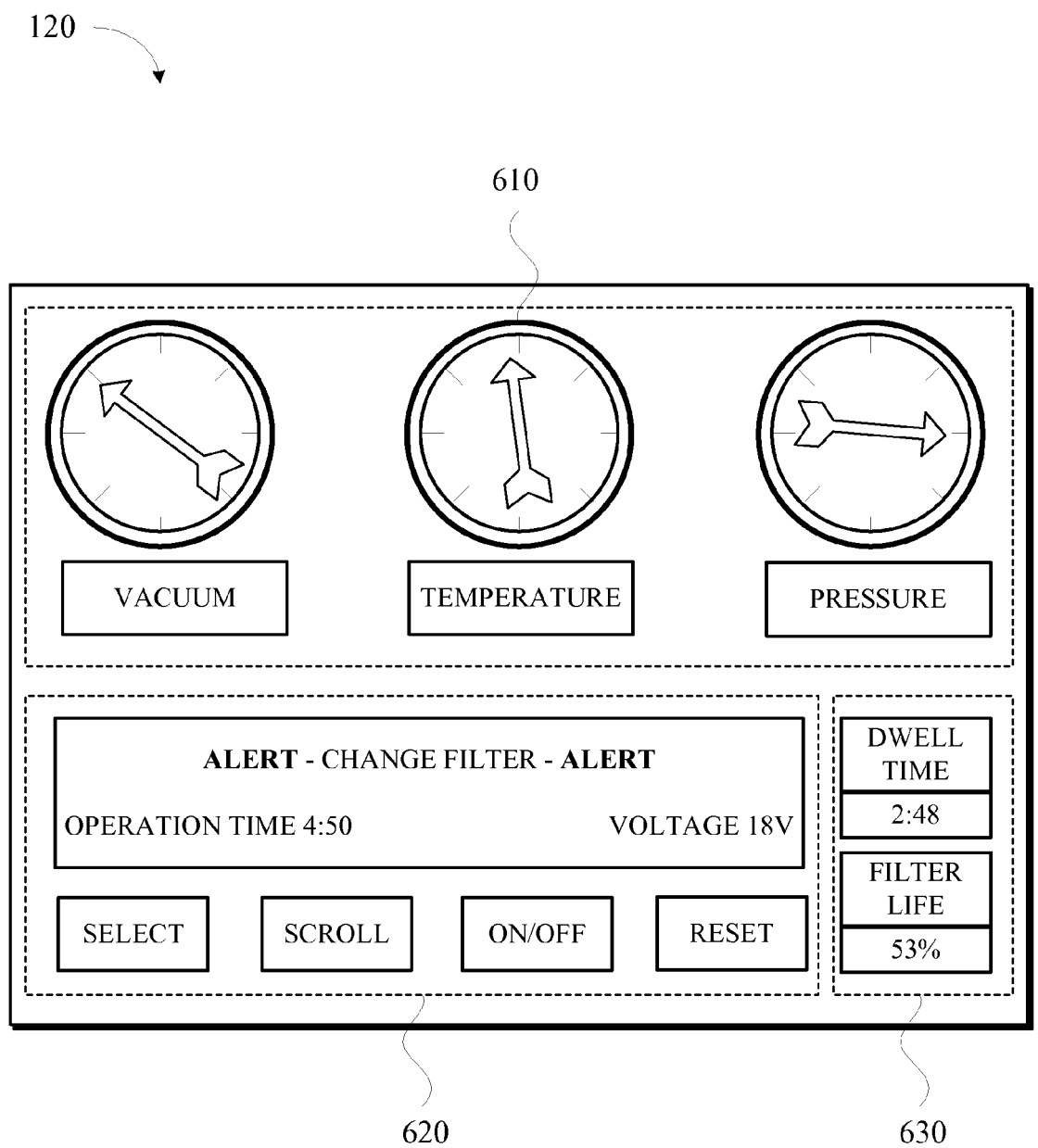
FIG. 6 is a schematic representation of a display panel suitable for use in conjunction with an electrostatic fluid filtration system in accordance with a preferred embodiment of the present invention.

Referring now to FIG. 6, Display panel 120 is used to communicate various types of information to the user or operator of electrostatic fluid filtration system 100 about the operation or performance of electrostatic fluid filtration system 100. As shown in FIG. 6, display panel 120 comprises various types of feedback or display means such as gauges 610, textual display panel 620, and auxiliary readout displays 630.

The life of the filter, when new, will initially be represented as 100% and then drop as the filter becomes impregnated with contaminants. Eventually, once the filter cannot hold any additional contaminants the unit will tell the operator to change the filter.

Figure 7:
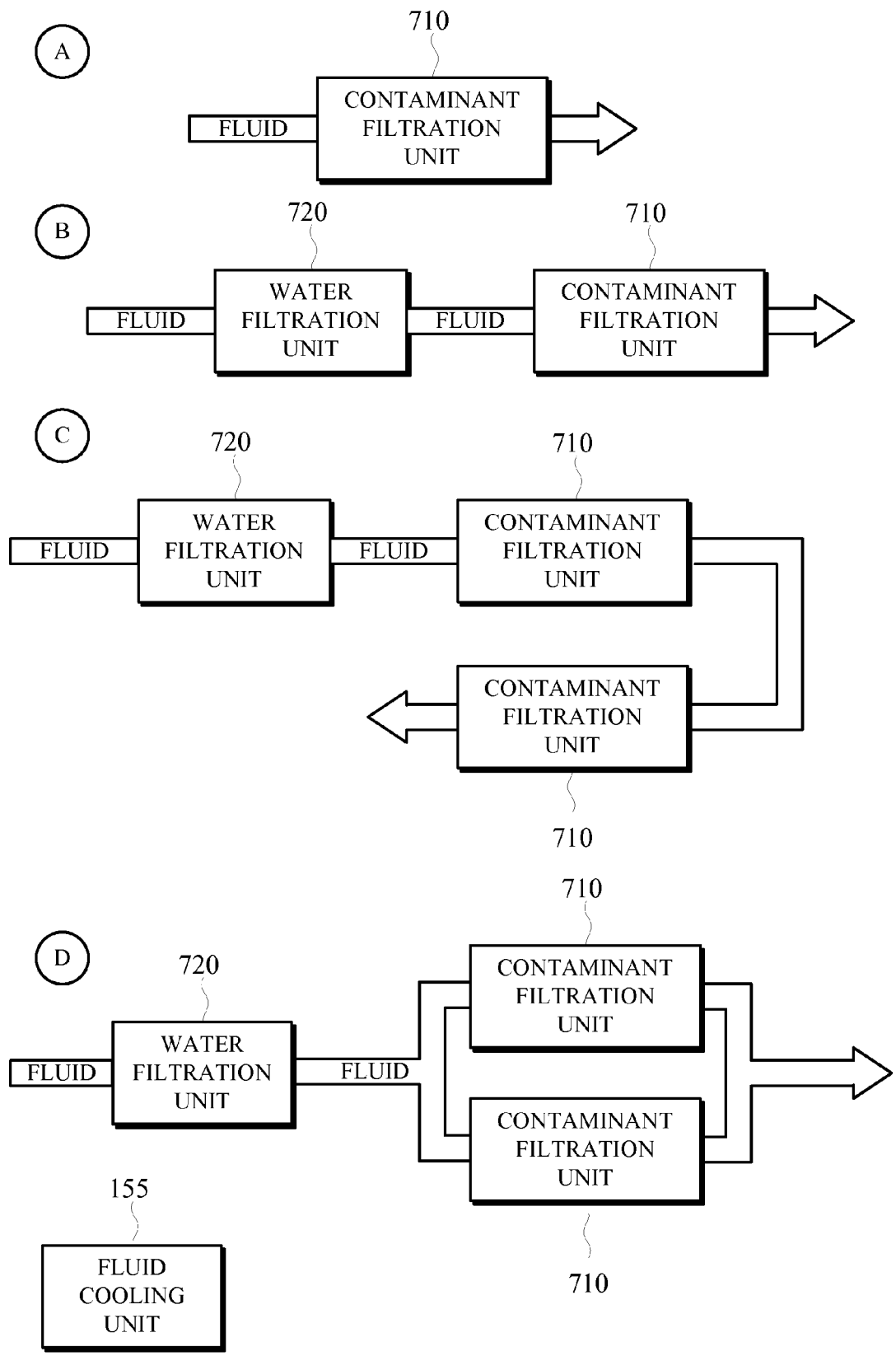
FIG. 7 is a series of schematic or block diagrams depicting various possible configurations for passing fluid through one or more filter cartridges in accordance with a preferred embodiment of the present invention.

Referring now to FIG. 7, a series of block diagrams depicting the flow of a target fluid through one or more filtration units 130 of FIG. 1 are shown. Those skilled in the art will recognize that the specific application, including the fluid to be treated, will determine the actual number and placement of filtration units 130. For example, the simplest configuration, indicated by the letter A, is a single contaminant filtration unit 710. This configuration would be useful for a relatively simple treatment application, where water in the fluid to be treated is not a consideration.

A more advanced configuration, indicated by the letter B, includes a water filtration unit 720 connected in series with a single contaminant filtration unit 710. This configuration would be useful for a relatively simple treatment application, where water in the fluid to be treated is a consideration. This configuration allows for the removal of the water from the fluid to be treated prior to the introduction of the fluid to be treated into contaminant filtration unit 710.

The configuration indicated by the letter C includes a single water filtration unit 720 connected in series with a first and then a second contaminant filtration unit 710. This configuration would be useful for a higher volume treatment application, where water in the fluid to be treated is a consideration and where the volume of fluid to be treated is greater. This configuration allows for the removal of the water from the fluid to be treated prior to the introduction of the fluid to be treated into contaminant filtration unit 710. The operation of multiple contaminant filtration units 710 in series will increase the dwell time of the fluid to be treated in the filter media, thereby increasing the amount of contamination removed from the fluid to be treated. In this fashion, the filtration process may be tailored for the specific contaminants.

The configuration indicated by the letter D includes a single water filtration unit 720 connected in series with a pair of contaminant filtration units 710 that are connected in parallel. This configuration would be useful for a higher volume treatment application, where water in the fluid to be treated is a consideration and where the volume of fluid to be treated is greater. This configuration allows for the removal of the water from the fluid to be treated prior to the introduction of the fluid to be treated into contaminant filtration units 710. The operation of contaminant filtration units 710 in parallel will allow for a greater volume of fluid to be treated over a shorter period of time.

Finally, it should be noted that a fluid cooling unit 155 of FIG. 1 may also be deployed in connection with any combination of filtration units 710 and 720 in order to enhance the effectiveness and efficiency of electrostatic fluid filtration system 100 of FIG. 1. Cooling unit 155 is any type of device or mechanism that may be used to lower the temperature of the fluid to be treated. For example, a water-cooled or air-cooled heat exchange device may be used for cooling unit 155. In general, fluid cooling unit 155 will be positioned in line ahead of any fluid filtration unit and will be used to cool the temperature of the fluid to be treated prior to filtration.

In the most preferred embodiments of the present invention, the fluid to be treated will be passed through cooling unit 155 where the temperature of the fluid to be treated will be lowered prior to the introduction of the fluid to the electrostatic filter. The temperature decrease will cause soluble free radical foreign contamination matter, which cannot generally be removed by electrostatic filters, to become insoluble and thus be removable by the electrostatic filtration unit.

Figure 8:
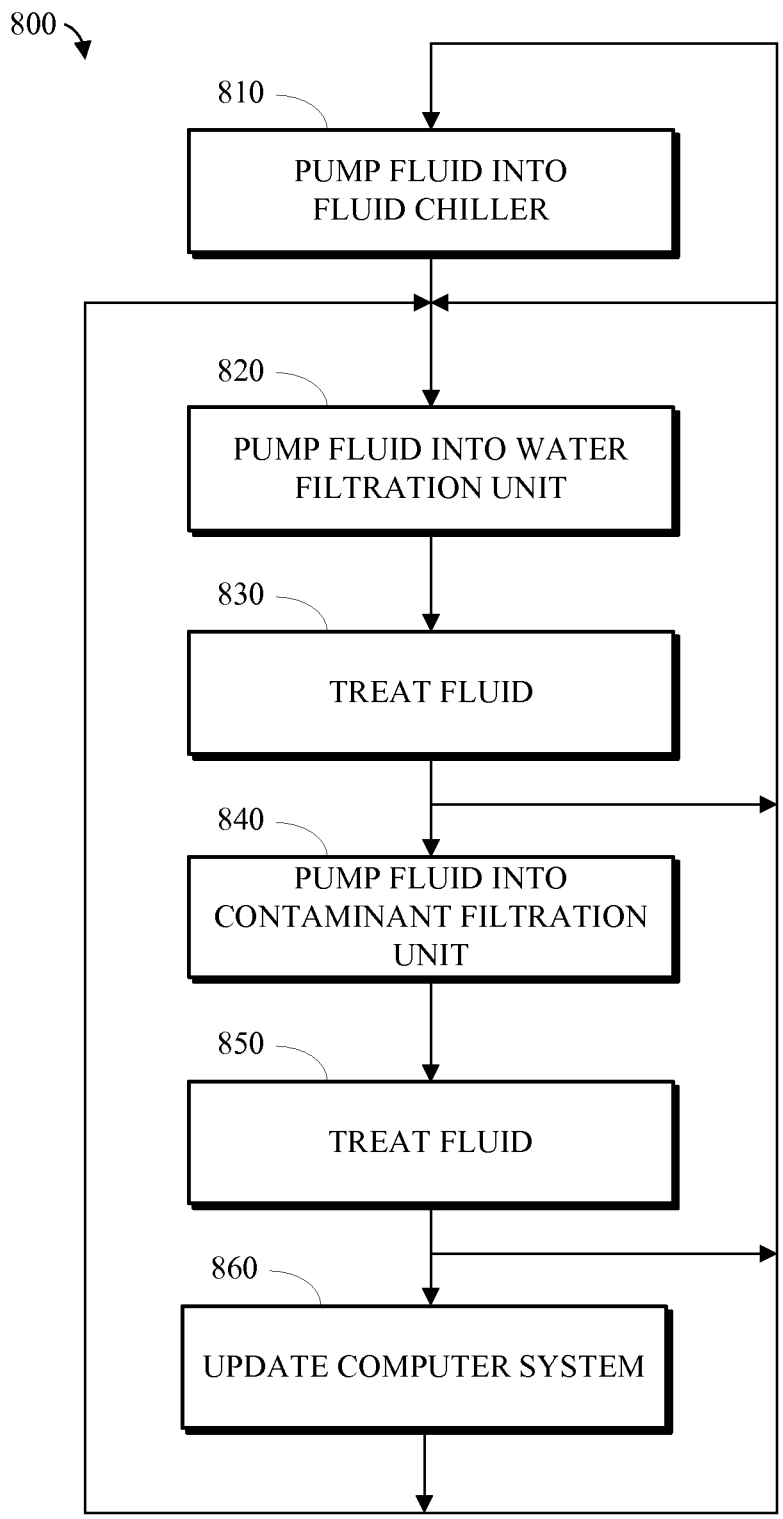
FIG. 8 is a flow chart for a filtration method in accordance with a preferred embodiment of the present invention.

Referring now to FIG. 8, a method 800 for treating fluids, including dielectric fluids, is depicted. As shown in FIG. 8, the fluid to be treated is pumped into a fluid chiller (Step 810). Those skilled in the art will recognize that Step 810 is preferred but optional step. After the temperature of the fluid to be treated has been reduced, the fluid to be treated is pumped into a water filtration unit (Step 820).

After entering the water filtration unit, the fluid to be treated is treated to remove any undesirable amounts of water from the fluid (Step 830) as described in conjunction with FIG. 5. In the case of dielectric fluids, this step will help to precipitate certain contaminants, thereby enhancing the treatment of the fluid in subsequent treatment steps.

After the undesirable water has been removed from the fluid to be treated, the fluid to be treated is pumped into the fluid contaminant filtration unit (Step 840) and treated (Step 850) as described in conjunction with FIG. 4. All along the way and during the treatment process, computer control unit 200 is used to monitor the operation of the system and update the various parameters of the treatment process.

Figure 9:
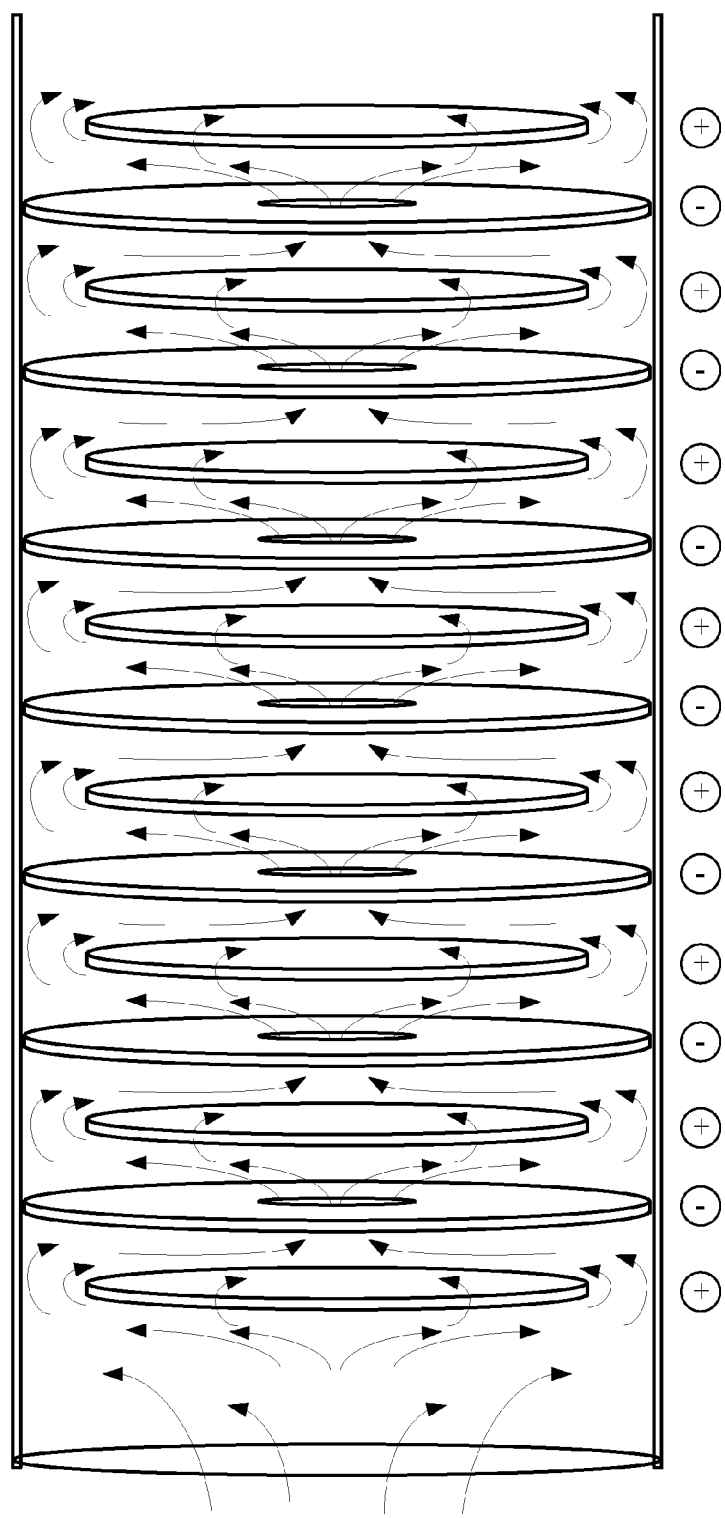
FIG. 9 is a perspective representation illustrating the flow of the liquid to be treated through a contaminant filtration cartridge in accordance with a preferred embodiment of the present invention.

Referring now to FIG. 4 and FIG. 9, the flow pattern of the fluid to be treated as it flows through a contaminant filtration unit such as contaminant filtration cartridge 400 of FIG. 4 (for purposes of explanation, filtration media sections 440 are not shown in FIG. 9). As shown in FIG. 9, the fluid to be treated will flow upwards as it is introduced into the bottom of cartridge 400, it will rise until it begins to contact the bottom of positively chargeable plates 430 and flow towards the outer wall of conductive housing 320. Upon reaching the outer wall of housing 320, the fluid to be treated will eventually rise up, around, and over positively chargeable plates 430 until it contacts the lower surface of negatively chargeable plates 420 where it will then flow radially inward until it flows through the large opening in the center of negatively chargeable plates 420. The fluid to be treated will then flow through the opening. This process continues as the fluid to be treated is continually pumped into the bottom of housing 320, passing through filtration media 440 as it rises. The process will repeat until the fluid to be treated has passed over or through each layer of filtration cartridge 400. As shown in FIG. 9, the arrangement of the plates creates a series of electrical fields with alternating polarities.

The electrostatic filtration system described herein is specifically designed and configured to remove sub-micron insoluble contamination particles from various fluids, including dielectric lubricating oils, thereby reducing or eliminating much of the industrial productivity losses and costs incurred during many manufacturing processes. The electrostatic filtration system of the present invention is designed to run unattended around the clock, seven days of the week, every day of the year. Additionally, in at least one preferred embodiment of the present invention, the electrostatic filtration unit is deployed in a "kidney loop" configuration and attached to the reservoir of a lubrication system that is providing lubricating oil for heavy machinery.

The internal computer system on the electrostatic oil cleaner will monitor oil flow, voltage, filter life, leak detection, and temperature of the oil. Once the insoluble submicron contamination known to cause varnish is removed from the oil by the electrostatic oil cleaner, the oil through laws of physics will re-absorb the varnish build up on metal surfaces back into suspension in the oil. Once this varnish is back in the oil the electrostatic oil cleaner will remove them. Computer control unit 200 is configured to monitor the resistance in the replaceable filter. A new filter cartridge would have zero resistance and over time, as contaminants are filtered out of the fluid and bonded to the electrostatic filter, the measured resistance would increase.

Those skilled in the art will recognize that all pumps, valves, electrical sources, switches and the like used to achieve the flows and voltages discussed have not been shown in the interest of conciseness. However, where not specifically mentioned, those skilled in the art will be familiar with the types and sources for the various components described herein.

Lastly, it should be appreciated that the illustrated embodiments are preferred exemplary embodiments only, and are not intended to limit the scope, applicability, or configuration of the present invention in any way. Rather, the foregoing detailed description provides those skilled in the art with a convenient road map for implementing a preferred exemplary embodiment of the present invention. Accordingly, it should be understood that various changes may be made in the function and arrangement of elements described in the exemplary preferred embodiments without departing from the spirit and scope of the present invention as set forth in the appended claims.

The invention claimed is:

1. An apparatus for removing water and other contaminants from a fluid comprising:
   a selectively sealable conductive housing, said conductive housing comprising an outer wall; and
   a high voltage generator being electrically connected to a plurality of parallel electrode plates disposed within said conductive housing, wherein said high voltage generator is configured to produce a series of alternating electrical fields between each pair of electrode plates;
   a plurality of filtration media sections disposed between adjacent pairs of said electrode plates; and
   a pump connected to said conductive housing, said pump being configured to pump a fluid into said housing, wherein said fluid alternately flows radially inwards away from said outer wall in the presence of a first electrical field and radially outwards towards said outer wall in the presence of a second electrical field, wherein said second electrical field is oppositely charged from said first electrical field.

2. The apparatus of claim 1 wherein said conductive housing further comprises:
   a fluid inlet positioned at a lower end of said conductive housing;
   a fluid outlet positioned at an upper end of said conductive housing, said fluid inlet and said fluid outlet being in fluid communication; and
   a drain.

3. The apparatus of claim 1 further comprising a cabinet housing said high voltage generator.

4. The apparatus of claim 1 wherein said conductive housing is cylindrical.

5. The apparatus of claim 1 wherein said plurality of filtration media sections comprise one of reticulated foam, a pressed cellulose depth filtration pad, fiberglass, fiberboard, polyester, cotton, and zeolite.

6. The apparatus of claim 1 further comprising a water filtration unit, said fluid being introduced into said water filtration unit prior to said fluid being pumped into said conductive housing, said water filtration unit comprising a molecular sieve.

7. The apparatus of claim 1 wherein said high voltage generator charges each of said plurality of electrode plates, thereby creating a plurality of negatively charged electrode plate and a plurality of positively charged electrode plates.

8. The apparatus of claim 7 wherein each of said electrode plates are connected by a plurality of solid machined conductive inserts, said plurality of solid machined conductive inserts connecting each negatively charged electrode plate to every other negatively charged electrode plate and each positively charged electrode plate to every other positively charged electrode plate.

9. The apparatus of claim 8 wherein each of said plurality of negatively charged electrode plates has a circumference that is larger than a circumference of each of said positively charged electrode plates.

10. The apparatus of claim 9 wherein each of said plurality of negatively charged electrode plates is electrically connected to said conductive housing.

11. The apparatus of claim 1 further comprising a computer control unit, said computer control unit being configured to monitor a plurality of operating conditions associated with said apparatus.

12. The apparatus of claim 1 further comprising a fluid cooling unit, said fluid cooling unit being configured to lower a fluid temperature of said fluid prior to said fluid being pumped into said conductive housing.

13. The apparatus of claim 2 further comprising a double negative zone positioned prior to said fluid outlet, said double negative zone being configured to remove any positive charge from said fluid.

14. The apparatus of claim 2 further comprising an inlet zone connected to said fluid inlet and being positioned at a lower level of said conductive housing, said inlet zone being configured to remove turbulence from said fluid prior to said fluid contacting said electrode plates.

15. An electrostatic filtration system for removing water and other contaminants from a dielectric fluid, said system comprising:
  a cabinet;
  a water removal filter attached to said cabinet, said water removal filter being configured to produce a reduced-water dielectric fluid;
  a fluid cooling unit housed within said cabinet, said fluid cooling unit being attached to said water removal filter, said fluid cooling unit being configured to reduce a temperature of said dielectric fluid;
  a contaminant filtration unit attached to said cabinet, said contaminant filtration unit comprising:
    a conductive housing, said conductive housing comprising an outer wall;
    a plurality of parallel electrode plates disposed within said conductive housing;
    a plurality of filtration media sections disposed between adjacent pairs of said electrode plates;
  a high voltage generator, wherein said high voltage generator is configured to produce a series of alternating electrical fields between each pair of electrode plates;
  a pump connected to said cabinet, said pump being configured to pump a fluid into said conductive housing, wherein said fluid alternately flows radially inwards away from said outer wall in the presence of a first electrical field and radially outwards towards said outer wall in the presence of a second electrical field, wherein said second electrical field is oppositely charged from said first electrical field.

16. A method, said method for removing water and other contaminants from a fluid comprising the steps of:
  pumping a fluid into a contaminant filtration unit, said contaminant filtration unit comprising:
    a conductive housing, said conductive housing comprising an outer wall;
    a plurality of parallel electrode plates disposed within said conductive housing; and
    a plurality of filtration media sections disposed between adjacent pairs of said electrode plates;
  inducing a series of alternating electrical fields in said plurality of parallel electrode plates;
  pumping said fluid alternately radially away from said outer wall in the presence of a first electrical field and radially towards said outer wall in the presence of a second electrical field.

17. The method of claim 16 wherein said conductive housing further comprises:
  a fluid inlet positioned at a lower end of said conductive housing;
  a fluid outlet positioned at an upper end of said conductive housing, said fluid inlet and said fluid outlet being in fluid communication; and
  a drain.

18. The method of claim 16 wherein said plurality of filtration media sections comprise one of reticulated foam, a pressed cellulose depth filtration pad, fiberglass, fiberboard, polyester, cotton, and zeolite.

19. The method of claim 16 further comprising the step of monitoring a plurality of operational parameters associated with said fluid filtration unit and providing one or more feedback notifications in response to said operational parameters.

20. The method of claim 16 further comprising the steps of:
  removing water from said fluid prior to said fluid being pumped into said conductive housing; and
  lowering a temperature associated with said fluid prior to said fluid being pumped into said conductive housing.

21. The method of claim 20 further comprising the step of monitoring a voltage, a current, and a resistance associated with said contaminant filtration unit and determining a useful life for said plurality of filtration media sections.

* * * * *